(12) United States Patent
Fitzgibbon et al.

(10) Patent No.: US 8,824,801 B2
(45) Date of Patent: Sep. 2, 2014

(54) VIDEO PROCESSING

(75) Inventors: Andrew Fitzgibbon, Cambridge (GB); Alexander Rav-Acha, Jerusalem (IL); Pushmeet Kohli, Cambridge (GB); Carsten Rother, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 12/122,129

(22) Filed: May 16, 2008

(65) Prior Publication Data

US 2009/0285544 A1   Nov. 19, 2009

(51) Int. Cl.
*G06K 9/46* (2006.01)
*G06T 7/20* (2006.01)
*G06T 11/60* (2006.01)
*H04N 5/14* (2006.01)

(52) U.S. Cl.
CPC ...... *H04N 5/144* (2013.01); *G06T 2207/20164* (2013.01); *H04N 5/147* (2013.01); *G06T 7/2033* (2013.01); *G06T 11/60* (2013.01)
USPC ........... 382/190; 382/107; 382/173; 382/154; 382/199; 382/308

(58) Field of Classification Search
CPC ............................................. G06T 2207/10016
USPC .................. 382/190, 107, 173, 154, 199, 308
See application file for complete search history.

(56) References Cited

U.S. PATENT DOCUMENTS

| | | |
|---|---|---|
| 5,850,352 A | 12/1998 | Moezzi et al. |
| 5,907,626 A | 5/1999 | Toklu et al. |
| 5,999,173 A | 12/1999 | Ubillos |
| 6,587,156 B1 | 7/2003 | Stubler |
| 6,788,333 B1 | 9/2004 | Uyttendaele et al. |
| 6,819,318 B1 | 11/2004 | Geng |
| 6,956,573 B1 | 10/2005 | Bergen et al. |
| 7,006,706 B2 | 2/2006 | Sobel et al. |
| 7,289,662 B2 | 10/2007 | Keaton et al. |
| 2006/0244757 A1 | 11/2006 | Fang et al. |
| 2007/0031062 A1 | 2/2007 | Pal et al. |

FOREIGN PATENT DOCUMENTS

| | | |
|---|---|---|
| KR | 20050022306 A | 3/2005 |
| WO | WO03084249 | 10/2003 |
| WO | WO2006055512 A2 | 5/2006 |

OTHER PUBLICATIONS

Brown et al: "Automatic panoramic image stitching using invariant features", Inter. J. of Computer Vision, 2007.*
Irani et al: "Video indexing based on mosaic representations", Proceedings of IEEE, May 1998.*

(Continued)

*Primary Examiner* — Ruiping Li
(74) *Attorney, Agent, or Firm* — Pablo Tapia; Jim Ross; Micky Minhas

(57) ABSTRACT

A method and apparatus for processing video is disclosed. In an embodiment, image features of an object within a frame of video footage are identified and the movement of each of these features is tracked throughout the video footage to determine its trajectory (track). The tracks are analyzed, the maximum separation of the tracks is determined and used to determine a texture map, which is in turn interpolated to provide an unwrap mosaic for the object. The process may be iterated to provide an improved mosaic. Effects or artwork can be overlaid on this mosaic and the edited mosaic can be warped via the mapping, and combined with layers of the original footage. The effect or artwork may move with the object's surface.

18 Claims, 11 Drawing Sheets

(56) References Cited

OTHER PUBLICATIONS

PCT International Search Report dated Jan. 12, 2010 for corresponding PCT Application No. PCT/US2009/039728 filed Apr. 7, 2009, 3 pages.
Agarwala, et al, "Interactive Digital Photomontage", retrieved at <<http://grail.cs.washington.edu/projects/photomontage/>>, ACM SIGGRAPH '04 Conference Proceedings, pp. 1-9.
"Art of Optical Flow", retrieved Aug. 11, 2008 at <<fxguide.com>>, fxguide, Feb. 28, 2006, pp. 1-26.
Baker, et al, "A Database and Evaluation Methodology for Optical Flow", Proceedings of 11th IEEE International Conference on Computer Vision, Oct. 2007, pp. 1-8.
Bhat, et al, "Piecewise Image Registration in the Presence of Multiple Large Motions", Proceedings of Computer Vision and Pattern Recognition, pp. 1-7.
Bhat, et al, "Using Photographs to Enhance Videos of a Static Scene", retrieved Jul. 30, 2008 at << http://grail.cs.washington.edu/projects/videoenhancement/videoEnhancement.htm>>, Eurographics Symposium on Rendering, pp. 1-3.
Black, et al, "A Framework for the Robust Estimation of Optical Flow", International Conference on Computer Vision, pp. 1-6.
Blake, et al, "Visual Reconstruction", the MIT Press, pp. i-iv, 1-220.
"Boujou 4,1", retrieved Jul. 30, 2008 at <<http://www.2d3.com/extras/print.php?q=cHJvZHVjdC8/dj0x>>, 2d3, pp. 1-2.
Boykov, et al, "Interactive Graph Cuts for Optimal Boundary & Region Segmentation of Objects in N-D Images", Proceedings of Internation Conference on Computer Vision, vol. I, Jul. 2001, pp. 105-112.
Brand, "Morphable 3D Models from Video", IEEE Computer Vision and Pattern Recognition, Vo. 2, 2001, pp. 456-463.
Bregler, et al, "Recovering Non-Rigid 3D Shape from Image Streams", Proceedings of IEEE Computer Vision and Pattern Recognition, pp. 1-7.
Brown, "Automatic Panoramic Image Stitching Useing Invariant Features", Intl. J. Comput. Vision 74, 1, pp. 1-16.
Brox, et al, "High Accuracy Optical Flow Estimation Based on a Theory for Warping", Proceedings 8th European Conference on Computer Vision, vol. 4, May, 2004, pp. 1-12.
Bruhn, et al, "Lucas/Kanada Meets Horn/Schunck: Combining Local and Global Optic Flow Methods", International Journal of Computer Vision 61(3), 2005, pp. 211-231.
Capel, "Image Mosaicing and Super-Resolution", University of Oxford, 2001, pp. i-v, 1-263.
Costeira, et al, "A Multibody Factorization Method for Independently Moving Objects", Kluwer Academic Publishers, 1998, pp. 159-179.
Debevec, et al, "'Modeling and Rendering Architecture from Photographs: A Hybrid Geometry- and Image-Based Approach", Proceedings ACM Siggraph, Jan. 19,1996, pp. 1-33.
Frey, et al, "Learning Appearance and Transparency Manifolds of Occluded Objects in Layers", IEEE Computer Vision and Pattern Recognition, pp. 1-8.
Gay-Bellile, et al, "Direct Estimation of Non-Rigid Registrations with Image-Based Self-Occlusion Reasoning", Proceedings of International Conference on Copmuter Vision, pp. 1-6.
Gu, et al, "Geometry Images", ACM Trans. Graph. Proceedings of SIGGRAPH, pp. 355-361.
Hengel, et al, "VideoTrace: Rapid Interactive Scene Modelling from Video", SIGGRAPH, pp. 1-5.
Irani, et al, "Efficient Representations of Video Sequences and Their Applications", retrieved at <<http://citeseer.ist.psu.edu/cache/papers/cs/5645/ftp:zSzzSzftp.wisdom.weizmann.ac.ilzSzpubzSziranizSzPAPERSzSzmosaics.pdf/irani96efficient.pdf>>, David Sarnoff Research Center, pp. 1-39.
Irani, et al, "Mosaic Based Representations of Video Sequences and Their Applications", IEEE, 1995, pp. 605-611.
Jepson, et al, "A Layered Motion Representation with Occlusion and Compact Spatial Support", Springer-Verlag, 2002, pp. 692-706.
Lempitsky, "Seamless Mosaicing of Image-Based Texture Maps", Proceedings of IEEE Computer Vision and Pattern Recognition., pp. 1-6.
Li, et a!, "Video Object Cut and Paste", Microsoft Research Asia, pp. 1-6.
Liu, et al, "Motion Magnification", ACM Trans. Graph (Proceedings of SIGGRAPH), pp. 519-526.
Peleg, et al, "Panoramic Mosaics with VidoeBrush", retrieved at <<http://www.vision.huji.ac.il/papers/iuw97-videobrush.pdf, pp. 1-4.
Sand, et al, "Particle Video: Long-Range Motion Estimation using Point Trajectories", Proceedings IEEE Computer Vision and Pattern Recognition, pp. 1-8.
Seetzen, et al, "High Dynamic Range Display Systems", ACM Trans. Graph. (Proceedings of SIGGRAPH), pp. 1-9.
Shade, et al, "Layered Depth Images", Proceedings of ACM Siggraph, Jul. 19-24, 1998, pp. 231-242.
Shi, et al, "Normalized Cuts and Image Segmentation", IEEE Transactions on Pattern Analysis and Machine Intelligence, Vol, 22, No, 8, Aug. 2000, pp. 888-905.
Torresani, et al, "Nonrigid Structure-from-Motion: Estimating Shape and Motion with Hierarchical Priors", IEEE Transactions on Pattern Analysis and Machine Intelligence, vol. 30, No. 5, pp. 878-892.
Turk, et al, "Zippered Polygon Meshes from Range Images", Proceedings of ACM SIGGRAPH, 1994, pp. 1-8.
"Voodoo Camera Tracker: A Tool for the Ingegration of Virtual and Real Scenes", retrieved Jul. 30, 2008 at <<http://www.digilab.uni-hannover.de/docs/manual.html>>, Digilab, pp. 1-33.
Wang, et al, "Representing Moving Images with Layers", IEEE Transactions on Image Processing Special Issue: Image Sequence Eompression, vol. 3, No. 5, Sep. 1994, pp. 1-13.
Woodford, et al, "Efficient New-View Synthesis Using Pairwise Dictionary Priors", Proceedings of Computer Vision and Pattern Recognition, pp. 1-8.
Zhou, et al, "Seamless Texturing of Arbitrary Surfaces from Multiple Images", ACM Trans. Graph. (Proceedings of SIGGRAPH), pp. 1-8.
Zigelman, et al, "Texture Mapping Using Surface Flattening via Multi-Dimensional Scaling", IEEE Trans. on Visualization and Computer Graphics 8, 2, Feb. 21, 2000, pp. 1-9.
Cox, T.F. and M.A.A. Cox, "Multidimensional Scaling", second edition, 2001, pp. 61-92.
Rathi, et al. "Tracking Deforming Objects Using Particle Filtering for Geometric Active Contours" IEEETransactions on Pattern Analysis and Machine Intellegence, vol. 29, No. 8, Aug. 2007, 6 pages.
Mowbray, et al. "Extraction and Recognition of Periodically Deforming Objects by Continuous, Spatio-temporal Shape Description" 0-7695-2158-4/04 (C) 2004 IEEE, 7 pages.
Triggs, "Bundle Adjustment—A Modern Synthesis" Vision Algorithms: Theory & Practice, B. Triggs, A. Zisserman & R. Szeliski (Eds.), Springer-Verlag LNCS 1883, 2000, 71 pages.
Badino, et al. "Stereo Vision-Based Detection of Moving Objects Under Strong Camera Motion" International Conference, 2006, 8 pages.

* cited by examiner

VIDEO PROCESSING

BACKGROUND

There are various known techniques for processing and digitally altering video images which may be used, for example, in 'post production' processes to add special effects to video, to remove defects or unwanted objects from video, or the like. Some known automatic techniques map points on a video image by tracking camera movement and using the tracking data to produce point clouds. More detailed models can be built using interactive tools which aid the recovery of polyhedral surface models (which are also known as surface meshes) from video. Point clouds and surface models can then be used to alter the video footage. However, if the video footage includes non-rigid scenes, for example, deformations in objects such as those exhibited by a talking face, this can prevent an accurate model from being formed.

The embodiments described below are not limited to implementations which solve any or all of the disadvantages of known video processing techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method and apparatus for processing video is disclosed. In an embodiment, image features of an object within a frame of video footage are identified and the movement of each of these features is tracked throughout the video footage to determine its trajectory (track). The tracks are analyzed, the maximum separation of the tracks is determined and used to determine a texture map, which is in turn interpolated to provide an unwrap mosaic for the object. The process may be iterated to provide an improved mosaic. Effects or artwork can be overlaid on this mosaic and the edited mosaic can be warped via the mapping, and combined with layers of the original footage. The effect or artwork may move with the object's surface.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
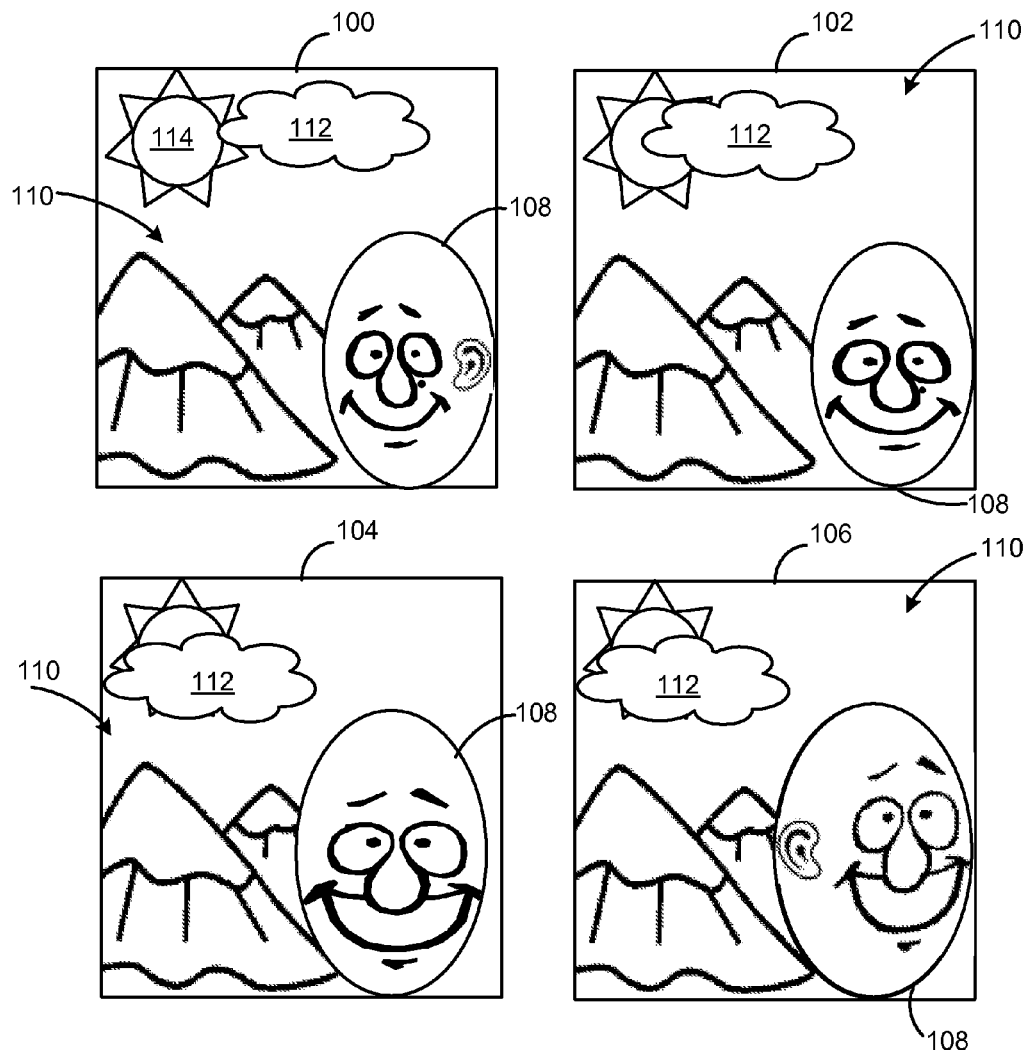
FIG. 1 shows four example frames from a portion of video footage.

FIG. 1 shows a representation of four example frames 100, 102, 104, 106 taken from a portion of video footage. The footage comprises a man 108 standing in front of a mountain vista 110, who turns from right to left with a gradually broadening smile. The background mountain vista 110 also changes over time as a cloud 112 passes in front of the sun 114.

In an example first frame 100, the man 108 is looking to his right. His left ear can be seen, as can a mole to the left of his nose. In a second example frame 102, taken from the video footage a few seconds later, the man 108 has turned to face the camera. His left ear is no longer visible. The cloud 112 has drifted over the sun 114. In a third example frame 104, the man 108 remains facing the camera and has begun to smile broadly. His mole is now partially obscured by his nose. The cloud 112 has drifted further over the sun 114. In a fourth example frame 105, the man 108 has turned to look to his left. The mole is now completely obscured by his nose and his right ear can be seen.

The video comprises a total of T frames. In each frame t, the real-life 3D surface currently on view captured is captured as a 2D projection. The 3D surface is designated S(u) herein, and the 2D projection is designated I(x), where u is a 2D vector with coordinates (u,v) and x is a 2D vector in image space with coordinates (x,y). It can be readily appreciated that the entire 3D surface is not shown in each frame 2D projection—for example, the left ear becomes occluded by the turning of the head and the mole becomes hidden by the man's nose. This is modeled herein as an 'occlusion mask' or 'object space visibility map' b(u) which has the function $$b(u) = \begin{cases} 1 & \text{if } \_S(u)\_ \text{ is } \_\text{visible} \\ 0 & \text{otherwise} \end{cases}$$

In addition, each point u on the surface has a color and this can be used to build a texture map C(u) of the surface. Each point in S(u) can be mapped to a point in C(u) using a 2D to 2D mapping, herein designated w(u). Each pixel in I(x) also has a color. As the light incident on the camera is being focused, the color of the pixel will depend on function of all the colors in the area of the surface which is focused onto that pixel. The area which is focused is dependent on the 'point-spread function' ρ of the camera. As will be familiar to the person skilled in the art, this function (which can be seen a measure of the quality of the camera) may be classified as a 'gaussian', 'pillbox' or 'boxcar' function and will depend on the camera used.

Each image I(x) can therefore be defined as $$I(x)=\int\rho(w(u)-x)C(u)b(u)J(u)du$$

where J(u) is the determinant of the mapping Jacobian (the 2×2 matrix J(u):=dw/du). The Jacobian changes the domain of integration from one 2D space (parameter space) to another (image space). As can be seen from the term w(u)−x, the Point-spread function is "centered" at x.

This model can be extended to cover every frame of the video footage. Assuming that the object's colors remain the same for each frame of video (this neglects the effect of lighting and shadows, which are addressed hereinafter), but the mapping w and the visibility map b will change from frame to frame. Thus a video sequence of T frames $\{I(x,t)\}T_{t=1}$, can be defined by $$I(x,t)=\int\rho(w(u,t)-x)C(u)b(u,t)J(u,t)du$$

A further modification can be made to consider multiple objects in the sequence. If the number of surfaces (including the background) is L (in the example of the figures, L is 4—the man 108, the background 110, the sun 112 and the cloud 114), with each object represented by the tuple of functions $(C^t, w^t, b^t)$. The images can then de defined as $$I(x,t)=\sum_{t=1}^{L}\int\rho(w^l(u,t)-x)C^l(u)b^l(u,t)J^l(u,t)du$$

where the visibility masks b are now encoding inter-object occlusions (such as when the cloud 114 obscures the sun 112) as well as self-occlusions.

The model set out above assumes that C, b, w and I are continuous functions. However, this is not the case in reality. Each image I can be considered as a 'grid' of pixels with a set of discrete quantities with integer values. The caret notation (e.g. û) will be used to designate such discrete quantities herein.

A goal of the method described herein to recover the unknown variables $\hat{C},\hat{w},\hat{b}$ from the given data $\tilde{I}$. This is solved using energy minimization, as the decomposition into color and motion allows strong regularization functions (which prevent over-fitting) to be placed on C, w and b. The energy measures the accuracy with which the parameters explain the input frames, as well as providing an a priori plausibility of the parameters—the lower the energy, the more accurate the parameters.

Figure 8:
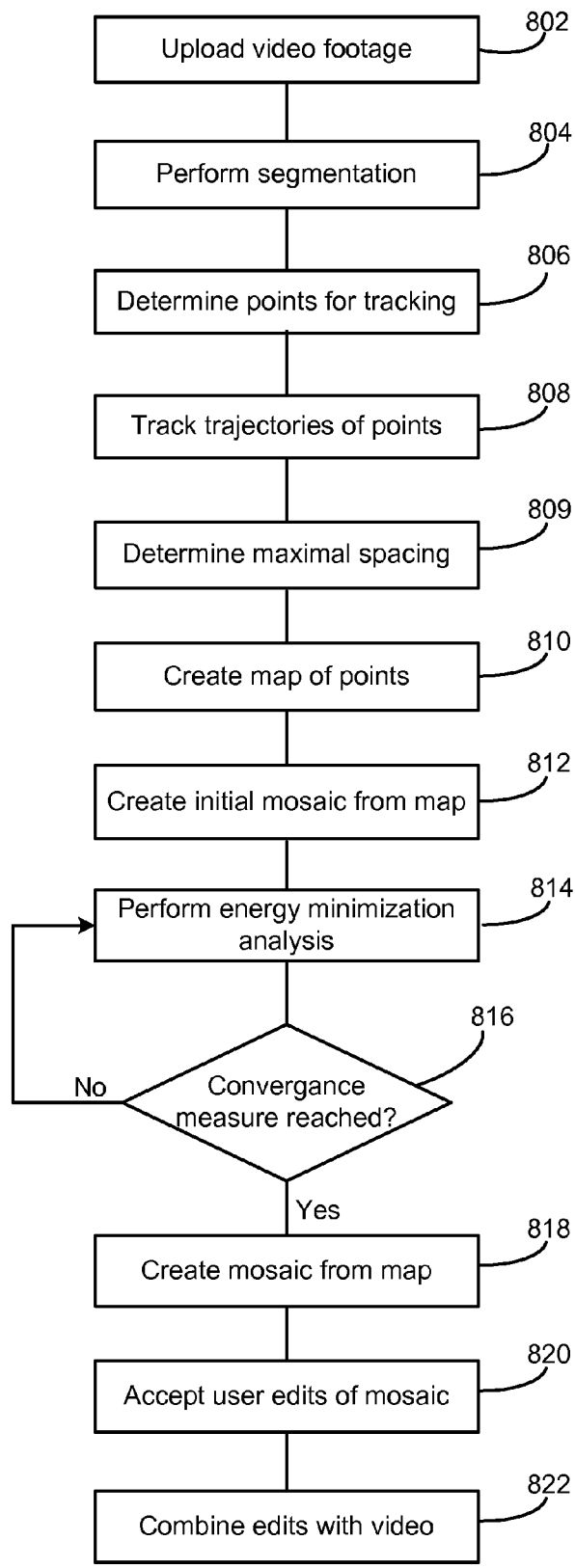
FIG. 8 is a flow diagram of a method for carrying out video editing.

The processing carried out on the video footage is described below with reference to FIGS. 2 to 7 and to the flow diagram of FIG. 8. Some of the steps are described in greater detail with reference to FIG. 9. The process leads to a mosaic which provides a common reference for every frame of the video footage. As will become apparent, the mosaic is made up of a sampling of the set of frames, and the processing in this example encourages the sampling such that each pixel in the mosaic is taken from the input frame t in which it is most fronto-parallel (i.e. forward facing).

Figure 11:
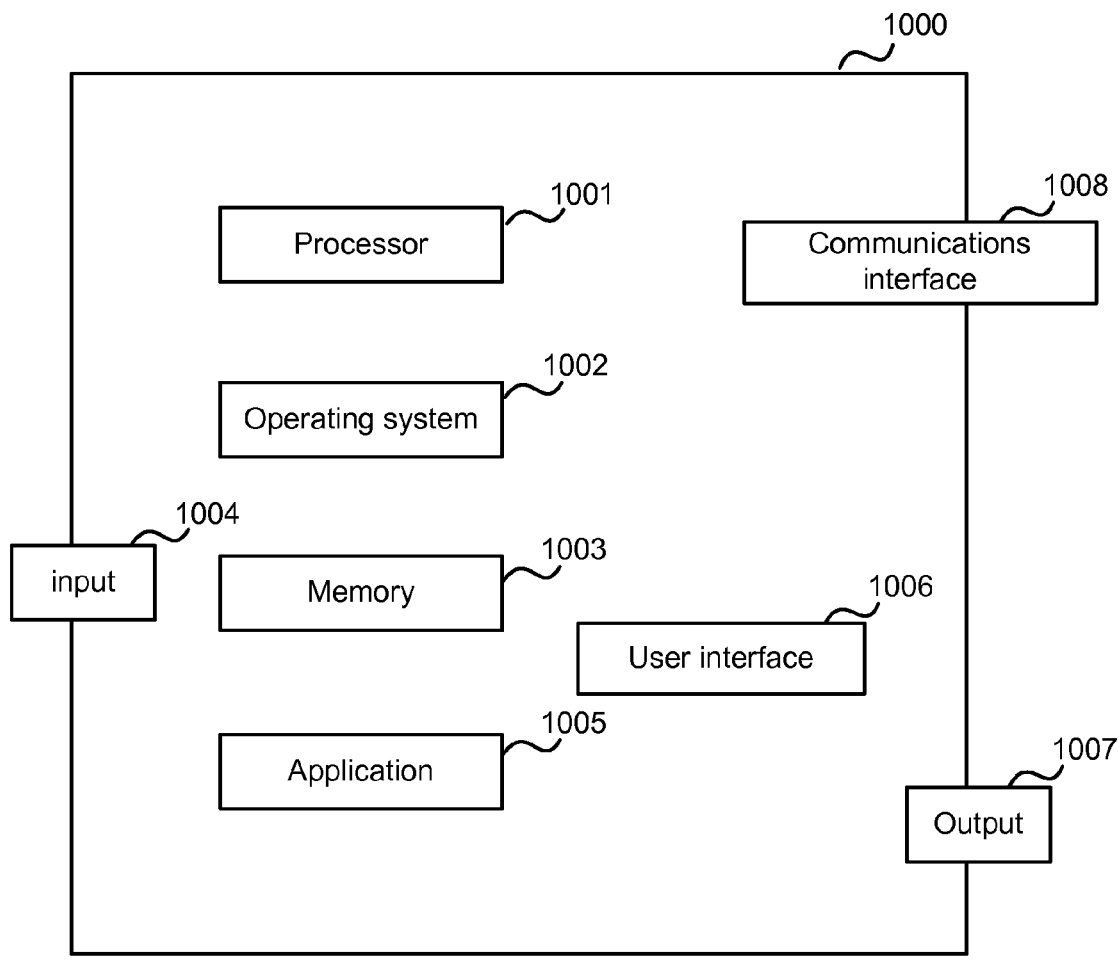
FIG. 11 illustrates an exemplary computing-based device in which embodiments of video editing may be implemented. Like reference numerals are used to designate like parts in the accompanying drawings.

The video footage is uploaded onto a computing device such as the device 1000 shown in FIG. 11 (block 802). The footage is separated into frames and each frame is segmented into independent objects (block 804). In this example, the objects are the man 108, the background 110, the sun 112 and the cloud 114. There are various known techniques which will be familiar to the skilled person for segmenting images using segmentation maps and it is beyond the scope of this disclosure of this document to discuss any particular technique in detail.

In this example, the computing device 1000 is able to compute segmentation maps automatically. However, in other examples, the method may include allowing or requiring user interaction to indicate the different objects. As will be familiar to the skilled person, this may comprise utilizing an input device to indicate which is a background object and which is a foreground object. This may comprise applying a 'brushstroke' to the image, for example using a mouse of the computing device 1000. The user could in some examples provide an input in relation to several frames and the segmentation can be propagated using optical flow. Manual input for segmentation may be appropriate for footage with many foreground objects with similar color statistics or background object(s) which exhibit similar movement to the foreground object(s), or any other footage that may confuse automatic algorithms. Automatic segmentation may be supplemented with human assistance. Alternatively or additionally, the method may allow or require user interaction at later stages of the method to correct or improve the output.

Figure 2:
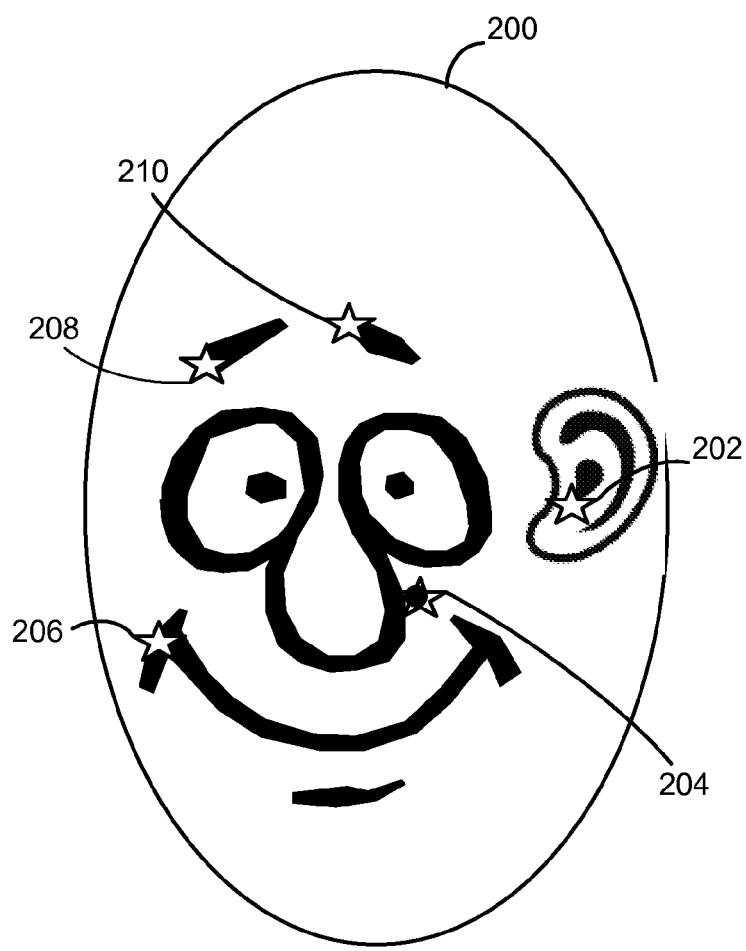
FIG. 2 shows a foreground object identified from the footage of FIG. 1.
Figure 3:
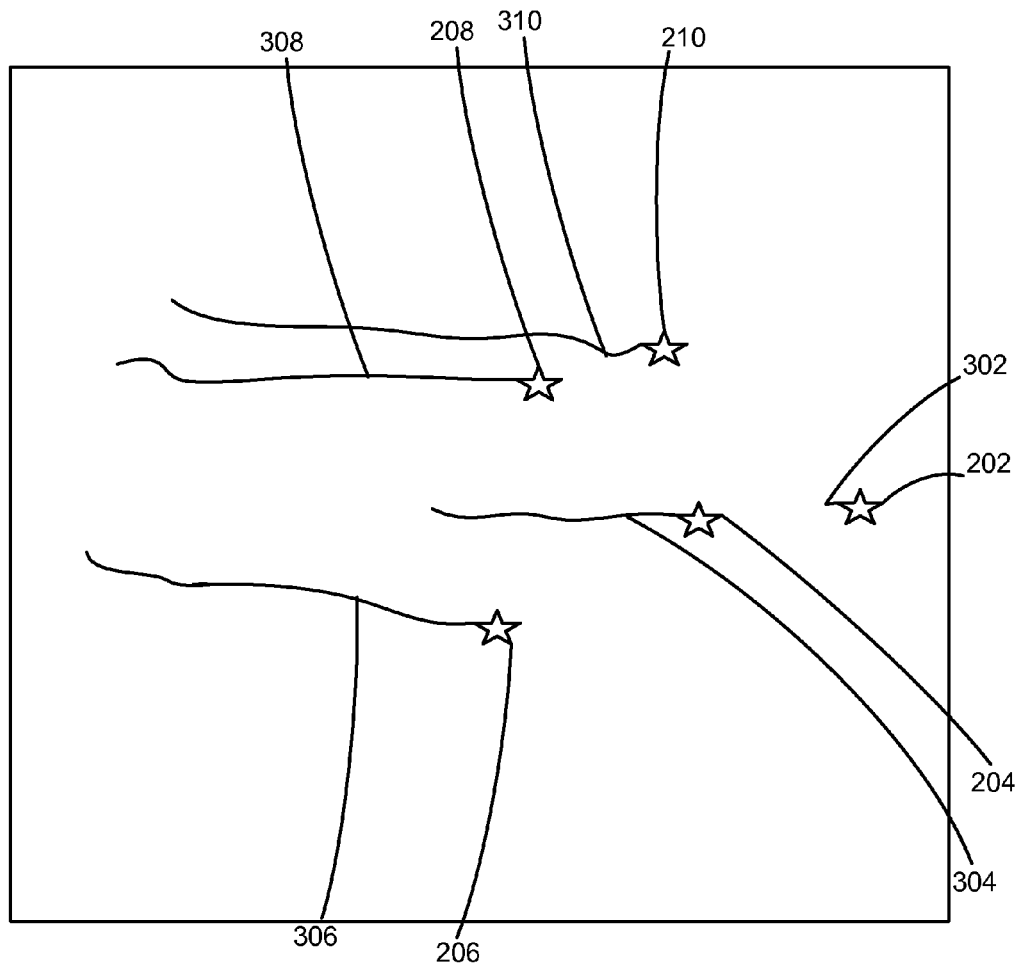
FIG. 3 shows a plurality of tracks generated from the video footage.

The different objects can then be isolated from one another and processed independently. FIG. 2 shows the man 200 once isolated from the background 110 following segmentation of the first example frame 100, and this segmentation is propagated through the frames.

FIG. 2 also shows a number of points 202, 204, 206, 208, 210 which have been determined (block 806) and which are associated with features of the image.

The points which are determined are selected on the basis that they can be tracked throughout the video footage. This is carried out by identifying easily recognizable features at points of high contrast or change within the image. In this example, the five points identified are the corner of the right ear hole 202, the mole 204, the right hand corner of the mouth 206, the right edge of the right eyebrow 208 and the right edge of the left eyebrow 210. It will be understood that in practical applications of the method, there may be many more points—perhaps many thousand—identified but the number of points shown herein is limited for reasons of clarity. The number of points identified may depend on the particular video and other examples may have a number of points between, for example, 100-5000 points.

The next stage is to track each of these points though the video footage (block 808). It is assumed that, although the model is changing its shape, the texture map is constant (i.e. the man's features do not change color throughout the footage). As each point 202, 204, 206, 208, 210 on the object moves through the video, it generates a 2D trajectory or track 302, 304, 306, 308, 310, which are shown schematically in FIG. 3. Various methods, which will be familiar to the skilled person, can be used for point detection and tracking.

The trajectory of an object point at location u is the sequence of 2D points w(u,t)=[w(u,1); w(u,2): . . . ;w(u,T)].

Next, it is determined for each point where it should be represented on a mosaic which represents the video footage. A map is created (block 809) which can then be used to generate the mosaic.

The point tracks 302, 304, 306, 308, 310 can be viewed as a multi-dimensional projection of the 2D surface parameters. As is discussed in greater detail below, in this example, each point is usually represented in the mosaic at the position along its trajectory where the track is furthest from all other tracks (i.e. where the tracks are optimally spaced). Every point (u,v)

in parameter space generates a vector of image positions $(x_1,y_1,x_2,y_2,\ldots x_t,y_t)$. The surface's parameter space can be recovered by computing an embedding of the point tracks into 2D, yielding coordinates for each track. Such embeddings are known from the field of visualization, and have been used to create texture coordinates for 3D models so will be familiar to the skilled person. In the method now described, there is no 3D model but analogous reasoning leads to an algorithm which chooses a 2 dimensional (u,v) coordinate for each trajectory to determine a difference, which is calculated such that distances in between the 2D coordinates is similar to the differences between the trajectories. In some examples, the difference may be a 2 dimensional vector and in other examples, the difference may be a vector norm difference. In this example, the separation of points in parameter space is commensurate with distances in the image frames at which pairs of tracks are maximally separated. This is also likely to be the point at which the underlying point is 'face on' in the image. In other examples, a 'softmax' function could be used to determine the difference. As will be familiar to the skilled person, a softmax function is a neural transfer function which calculates an output from a net input, and will also encourage the selection of fronto-parallel points.

Figure 4:
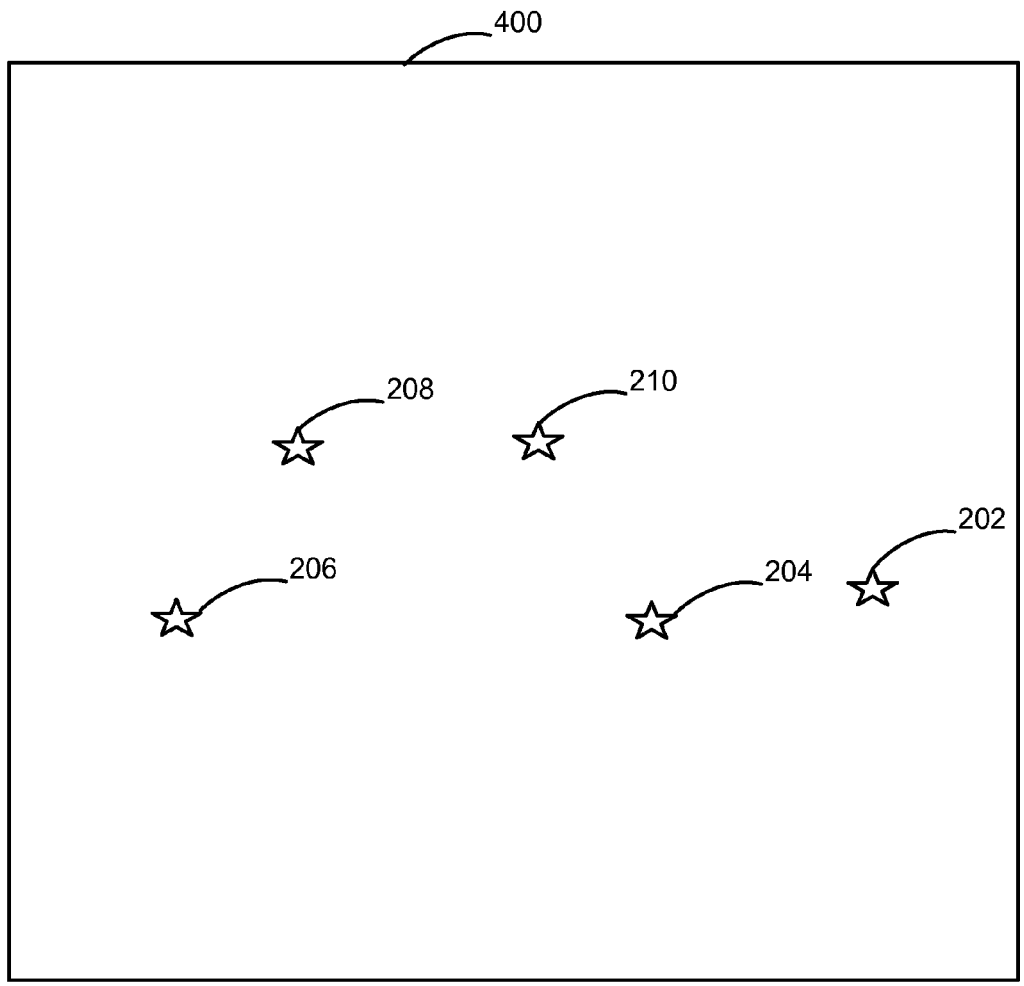
FIG. 4 shows a 2D map generating from the tracks shown in FIG. 3.

This allows a map 400 to be created (block 810), such as is shown schematically in FIG. 4. Interpolating this map 400 allows each image to be warped into a common frame (block 812), which can be represented as a mosaic such as the mosaic 500 shown in FIG. 5. Each point in the map 400 is replaced with the pixel corresponding to the feature in the video at its selected coordinates along its trajectory (which will correspond to a particular frame of the video footage). The interpolation uses a variation of the standard mosaic stitching technique, which has the property that it often chooses a good texture map, even when some per-frame mappings have large errors. This is discussed in greater detail below. The result is a mosaic such as the mosaic 500 shown in FIG. 5. This has the appearance of the object having been 'unwrapped', as if the surface has been peeled off the underlying object.

Iterations are then performed to refine the mosaic using energy minimization techniques (block 814) until a predetermined global convergence measure is achieved (block 816). The initial mosaic may not be the best representation of the footage, but will generally be good enough to create a reference template to match against the original frames. Because this matching is to a single reference, it reduces any 'drift' that may have been present after the original tracking phase. 'Drift' might occur if, for example, a shadow moves over an object and the shadow, rather than the feature, is tracked or if two similar features are close together and the track mistakenly follows first one, then the other. Regularization of the mapping defines a dense interpolation, so that track information propagates to occluded areas of the scene, giving a complete description of the object motion. In other words, originally the mapping is defined only at the feature points, and is reliable only there. However, because regularization "smooths" the mapping, it extends the mapping's definition from feature points to all uv space, although it is less reliable the farther a point is from a feature point.

Figure 9:
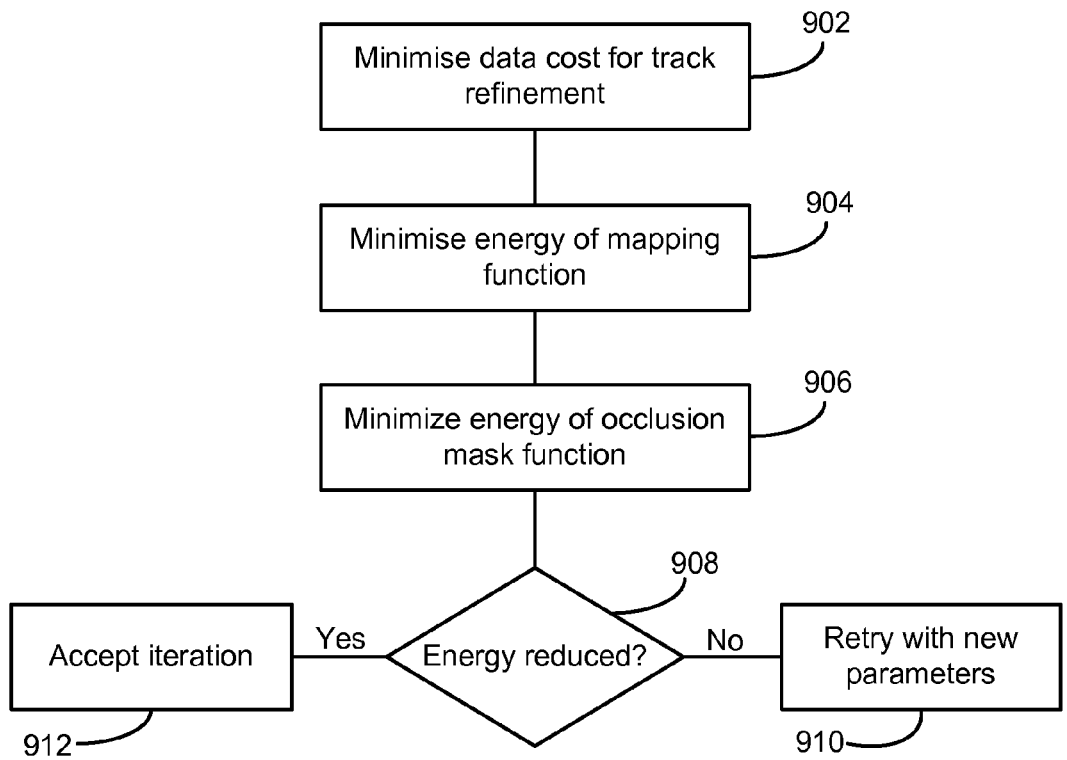
FIG. 9 is a flow diagram showing a step of the method in FIG. 8 in greater detail.

The energy minimization processes are now described with reference to FIG. 9. As will be familiar to the skilled person, the term 'energy minimization' is used to refer to an optimization procedure which tries to obtain a solution which is the best choice under a cost or "energy" function. The energy function associated with a solution measures its consistency with regard to observed data and prior knowledge.

A first step in the energy minimization procedure described herein comprises track refinement (block 902). Track refinement allows an improved estimate of inter-track distances (i.e. track differences), so an improved embedding and mosaic can be achieved by iterating these processes. Because, as is described in greater detail below, each stage minimizes the same energy function, a consistent global convergence measure can be defined, and the end-point for iteration can be determined. For example, the iteration may be carried out until the change in E is <1%.

A set of tracks can be assessed and refined as follows. The first term in the energy is the data cost, which encourages the solution to be consistent with the observed data. It encourages the model to predict the input sequence, and in particular to explain every input image pixel and therefore identify the best tracks. If the input frames are I(*, t). The basic form of the data cost is the sum $$\sum_{data} = \sum_{t} \sum_{x} \|\tilde{I}(\hat{x}, t) - I(\hat{x}, t)\|_{\tau}$$

The robust norm $\|e\|_{\tau} = \min(\|e\|,\tau)$ deals with outlier pixels due to lighting or small, unmodeled occlusions. The robust kernel width $\tau$ is set to match an estimate of image noise. For relatively noise-free video sequences, this can be set low, e.g. 10/255 gray-levels. For relatively noisy video sequences, this can be set higher, e.g. 50/255 gray-levels.

This cost is a discrete sum over the point samples in $\tilde{I}$, but contains a continuous integral in the evaluation of $I(\hat{x},t)$. Evaluating the integral yields the discrete model $$I(x, t) = \frac{\sum_{\hat{u}} A(\hat{u}, x, t) b(\hat{u}) C(\hat{u})}{\sum_{\hat{u}} A(\hat{u}, x, t) b(\hat{u})}$$

where the weights $A(\hat{u},x,t)$ are a function of the mapping w, its Jacobian, and the point-spread function. The weights measure the contribution of each $\hat{u}$ point to pixel x, and will be zero at all but a few points $\hat{u}$. The data cost is then:

$$\sum_{t} \sum_{\hat{x}} \left\| \tilde{I}(x, t) - \frac{\sum_{\hat{u}} A(\hat{u}, x, t) b(\hat{u}) C(\hat{u})}{\sum_{\hat{u}} A(\hat{u}, x, t) b(\hat{u})} \right\|_{\tau}$$

An approximation to the correct area sampling may be used, which is given by $$A(\hat{u}, x, t) = \begin{cases} J(\hat{u}) & \text{for } \_\hat{u} \in U(x, t) \\ 0 & \text{otherwise} \end{cases}$$

where $U(x, t)$ is the set of all texture-map pixels which project to a given image pixel, defined by $U(x,t)=\{\hat{u}|\rho(w(\hat{u},t)-x)>0\}$, which can be thought of as the points u which map to nonzero values of the point-spread function $\rho$ at x.

Minimizing the data term yields a reconstruction which maps every texture pixel to a single image pixel. If there is any color which appears in every frame, then C(u) is set to that color for all u, and the mapping is set to $$w(u, v, t) = \left(\frac{u}{w} - \frac{1}{2} + x(t), \frac{v}{h} - \frac{1}{2} + y(t)\right) \forall u,$$

where (x(t),y(t)) is a pixel of that color in frame t. This gives $E_{data}=0$, for any setting of b. The search for models is therefore restricted to those models which explain every pixel. This is imposed by incorporating a "penalty" function in the energy which is based on a "count of contributing pixels".

This yields an energy term $$\sum_{t}\sum_{\hat{x}}\left\{\begin{array}{l}\tau_c C(x, t) = 0 \\ 0 \text{ otherwise}\end{array}\right\}$$

where the threshold $\tau_c$ is a parameter of the algorithm. This formulation may then be tractably optimized, for example in graph-cut formulations.

Figure 5:
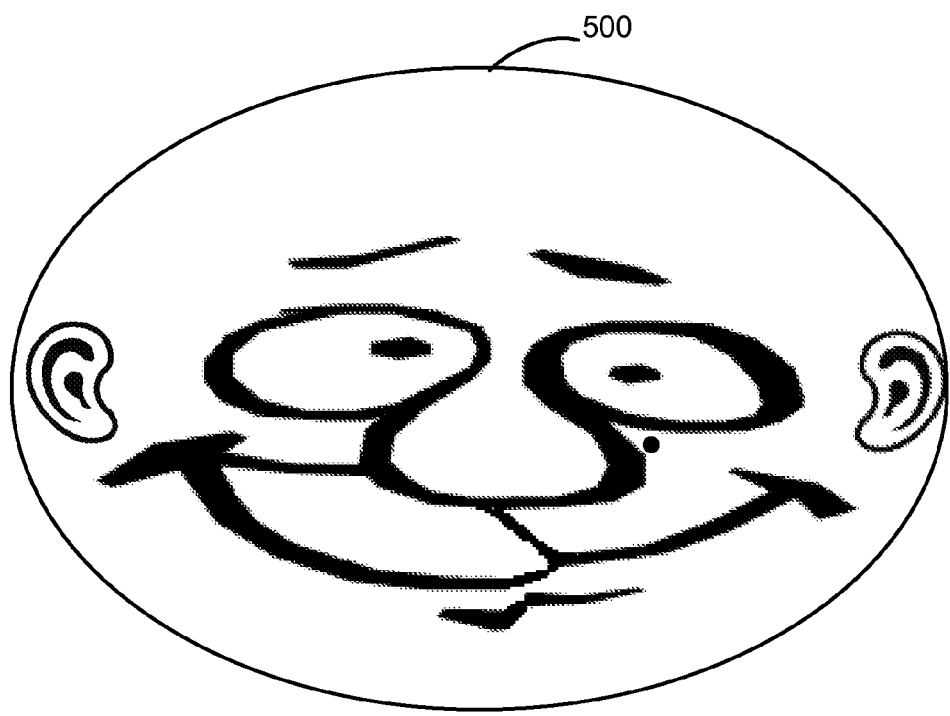
FIG. 5 shows a mosaic generated from the 2D map shown in FIG. 4.

As can be seen from FIG. 5, the mosaic uses the early frames of the video footage, e.g. the first example frame 102, for the left hand side of the face, as this portion was 'face on' in these early frames. The latter frames (characterized by the broad smile), e.g. the fourth example frame 106, is used is creating the right hand side of the face. This can also be optimized by ensuring that w is smoothly mapped.

The mapping w is a proxy for the projection of a 3D surface, which is assume to be undergoing smooth deformations over time. A relatively smooth camera motion is also assumed. The mapping is encouraged to be fronto-parallel in at least one frame. Without camera roll or zoom this could be expressed as the energy $$\sum_{\hat{u}} \min_{t} \|J(\hat{u}) - I\|_F^2$$

(where the Frobius norm of the matrix $\|A\|_F^2 = \Sigma_{ij} A_{ij}^2$)

For each u, the mapping Jacobian should be close to the identity in at least one frame. In order to account for rotation about the camera optical centre or for zoom, an overall 2D affine transformation for each frame, $H_t$, is estimated (as will be familiar to the skilled person, an 'affine transformation' is a transformation between two vector spaces which comprises a transformation followed by a translation) and the following function is minimized $$E_w = \sum_{\hat{u}} \min_{t} \|J(\hat{u}) - H_t\|_F^2$$

In combination with a temporal coherence term of the form:

$$E_{temporal} = \sum_{\hat{u},t} \|w_t(\hat{u}, t)\|^2$$

This leads to a spatial regularizer akin to a weak membrane. This regularizer leads to a way to initialize the parameterization. As will be familiar to the skilled person, a "weak membrane" model uses Markov Random Fields within the Bayesian inference framework for image reconstruction and segmentation problems.

The next step is to minimize the energy of the occlusion mask. It will be recalled that the occlusion map b is used to represent the effects of hidden surface removal, without explicitly modeling the 3D geometry. Using the assumption that discontinuities in b are rare, a Potts energy which counts discontinuities, as used in known image segmentation techniques is defined:

$$E_b = \sum_{(\hat{u},\hat{u}') \in N, t} Potts(b(\hat{u}, t), B(\hat{u}', t))$$

where N is the set of 2 x1 neighborhoods, and Potts($b_1$, $b_2$) is 1 if $b_1 \neq b_2$ and zero otherwise. A similar term is applied temporally, taking the mapping into account:

$$E_{btemporal} = \sum_{\hat{u},t} Potts(b(\hat{u}, t), b(\hat{u} + \Delta u(\hat{u}, t), t))$$

where $\Delta u(u,t) = J(u,t)^{-1}(w(u,t+1) - w(u,t))$, using the Jacobian to convert local displacements in the image into displacements on the mosaic.

A final regularizing term encourages the texture map C to have the same texture statistics as the input sequence. Neighboring pixels in the texture map are encouraged to come from the same input image by adding the texture prior described below.

A linear combination of the above terms yields the overall energy.

The energy is written as a function of the discrete variables $\hat{C}$, $\hat{w}$, $\hat{b}$:

$$E(\hat{C},\hat{w},\hat{b}) = E_{data}(\hat{C},\hat{w},\hat{b}) + \lambda_1 E_w(w) + \lambda_2 E_{wtemporal}(w) + \lambda_3 E_b(b) + \lambda_4 E_{btemporal}(b)$$

Several tuning parameters ($\lambda_{1...4}$, $\tau_{1...3}$) appear in the energy, which must be set. The scale parameter in the embedding distance calculation $\tau_3$ is set higher for less detailed images (or portions of images) (e.g. about 40 pixels) and lower for more detailed images (or portions of images) (e.g. about 10 pixels). This parameter can also be utilized as a convergence control, by starting from a high value and reducing.

The energy is minimized by coordinate descent, optimizing for subsets of the variables in turn.

Once each mapping w, and occlusion mask b have been derived, these are solved for the texture map C. Only the $E_{data}$ term of the energy depends on C, so for a fixed input Image size, the minimization is simply C=argmin$_c E_{data}$. Minimization under the robust norm can be cast as, for example, a graph-cut problem by restricting the choice of C. Specifically, an integer labeled s($\hat{u}$) is associated with each texture map pixel $\hat{u}$, which indicates one of the input frames from which C($\hat{u}$) is to be chosen. The input images are warped by the inverse of w, to generate registered images $I^w(\hat{u},t)$ from which C is optimized at any pixel U by computing $$s^* = \arg\min_{s} \sum_{t} (\tau, \|I^w(\hat{u}, t) - I^w(\hat{u}, s)\|)$$

and setting $C=I^w(\hat{u},s^*)$. At this point a texture prior may be added to the original energy, which encourages adjacent pixels in the texture map to be taken from the same input frame, yielding an energy of the form $$E_{data}^{robust}(\hat{s}) = \sum_{\hat{u}} \sum_{t} \min(\tau, \|I^w(\hat{u}, t) - I^w(\hat{u}, s(\hat{u}))\|) +$$

$$+ \lambda_{texture} \sum_{\hat{u}} \frac{Potts(s(\hat{u}), s(\hat{u} + (1, 0))) +}{Potts(s(\hat{u}), s(\hat{u} + (0, 1)))}$$

This may be optimized using, for example, graph-cut techniques, as will be familiar to the person skilled in the art.

One variable which does not appear as an explicit parameter of the energy functional relates to the parameterization of u space. The data cost $E_{data}$ is, by construction, invariant to reparametrization, but the regularizers are not. Specifically, the value of the regularization terms of the energy function is dependent on the parameterization of the u space (because derivatives with respect to u appear in these terms). This is not the case for the data cost, which is independent of how the u space is represented or encoded.

The initialization of the overall algorithm consists in obtaining sparse point tracks using standard computer vision techniques as was described above. The $i^{th}$ track is the set $\{\tilde{x}(u_i,t)|t \in T_i\}$ where $T_i$ is the set of frame indices in which the point is tracked, and $u_i$ is the unknown pre-image of the track in parameter space. Finding these $u_i$ will anchor all other computations. The input x may be viewed as samples of w at some randomly spaced points whose locations are not given, but can be discovered. u must be found for each value of x, using the regularizer which involves derivatives with respect to u.

Finding the optimal parameterization then consists of assigning the $u_i$ values such that the warp regularizer terms $E(w)+E_{wtemporal}(w)$ are minimized. For a given pair of tracks, with coordinates $u_i$ and $u_j$, the energy of the mapping which minimizes the regularizer (subject to the mapping being consistent with the tracks) must be determined.

$$\min_w E_w(w) + E_{wtemporal}(w)$$

Such that $w(u_i,t)=\tilde{x}(u_i,t) \forall t \in T_i$ $w(uj,t)=\tilde{x}(uj,t) \forall t \in Tj$ Only the value of the minimizing energy is required, not the mapping itself. It can be shown that the minimal energy in the pairwise case, as a function of $u_i$ and $u_j$ is $$\left(\frac{\|\tilde{x}(u_i, t_{ij}^*) - \tilde{x}(u_j, t_{ij}^*) - (u_i - u_j)\|}{\|(u_i - u_j)\|}\right)^2 \|(u_i - u_j)\| \text{ where}$$

$$t_{ij}^* = \arg\max_t \|\tilde{x}(u_i, t) - \tilde{x}(u_j, t)\|$$

Given several tracks as above, the $u_i$ are chosen to minimize the sum of weighted distances $$\sum_{ij} \|d_{ij} - (u_i - u_j)\|^2 \frac{1}{\|u_i - u_j\|} \text{ where } \cdot d_{ij} := \tilde{x}(u_i, t_{ij}^*) - \tilde{x}(u_i, t_{ij}^*)$$

This is analogous to embedding via multi-dimensional scaling, but with a distance weighting term $$\frac{1}{\|u_i - u_j\|}.$$

The minimization is implemented as an iterated reweighted least squares problem. In practice, to avoid numerical issues which will arise if $u_i$ and $u_j$ become close during optimization, an exponential weighting $\exp(-\|ui-uj\|/\tau_3)^2$ may be used. The affine transformation $H_t$ is estimated from sparse tracks and applied before embedding.

The implementation is as follows. Each pair of tracks is assigned a random weight, and the $u_k|k=1 \ldots t$ which minimize the quadratic form:

$$\sum_{ij} \mu_{ij} \|d_{ij} - (u_i - u_j)\|^2$$

are found. The $\mu_{ij}$ are then recomputed with the new u using $\mu_{ij}=\exp(-(\|u_i-u_j\|/\tau_3)^2)$, and the process is iterated to a fixed point. The embedding is restarted several times, with different random initialization, and the u's which minimize the original energy are retained.

As there can be many thousands of tracks, the method may comprise initializing with a subset of tracks (1000, for example), and solving the embedding for that subset. Those u values are fixed, and the next subset is minimized, including the pairwise terms which link from the new set to the set which has already been solved. Each sub-problem is a quadratic form of size 1000×1000, which can be computed in a few minutes on a typical home computer.

The mosaic size is naturally selected by this process: because distances in (u, v) space are measured in pixels, and because pairs of points are encouraged to be as far apart as their greatest separation in the input sequence, a bounding box of the recovered coordinates is sized to store the model without loss of resolution.

Next a dense mapping w, may be obtained given the tracks and their embedding coordinates. In this case, $$\min_w E_w(w) + E_{wtemporal}(w)$$

Such that $w(u_i,t)=\tilde{x}(u_i,t) \forall t \in T_i$ $w(u_j,t)=\tilde{x}(uj,t) \forall t \in Tj$ is minimized with one constraint per track, and the resulting w can be shown in 1D to be linear interpolation of the initial track data. Although this unvalidated assumption means that there is no guarantee of minimizing the original energy, a check (block 908) can be made to determine if the overall energy has reduced at each iteration, and iterations where it increases can be retried with different parameters until the energy reduces (block 910). Using ad-hoc optimizers, even when they may have their own tuning parameters, will affect only rate of convergence, not correctness, if reduction of the original energy is verified at each stage. If the energy has reduced, the iteration is accepted (block 912) and it is considered whether the convergence measure has been reached (block 816).

In some cases, occlusion may be taken into account, which requires minimizing over w and b.

Given an initial approximation to w as above, it is possible to solve simultaneously for b and a refined mapping. By solving for an update $\Delta w$ to the initial estimate, the problem may be cast as one of optical flow computation. The minimization is now over all energy terms, as all terms depend on w and b.

The energy for the update is implemented as a variant of robust optical flow, alternating search for $\Delta w$ and b on a multiresolution pyramid. If $\hat{C}$ is the current estimate of the texture map, and following the analogy with optic flow, denote $\tilde{C}(u)$ the inverse-warp of image I(x, t) under the current mapping estimate w, that is $\tilde{C}(u)=\tilde{I}(w(u),t)$ Then we wish to determine the update $\Delta w$ which minimizes $$E_{data}(\Delta W) = \sum_{\hat{u}} b(\hat{u}) \|\tilde{C}(\hat{u}) - \hat{C}(\hat{u} + \Delta W)\|^2$$

under the local regularizers $$E_{\Delta W} = \lambda_{wl} \sum_{\hat{u}} \|\Delta W_{uu}\|^2 + \|\Delta W_{vv}\|^2$$

with $E_b$, and $E_{btemporal}$ as above. Linearizing $$E_{data}(\Delta W) = \sum_{\hat{u}} b(\hat{u}) \|\tilde{C}(\hat{u}) - \hat{C}(\hat{u} + \Delta W)\|^2$$

gives a linear system in w which is readily solved.

Temporal smoothness is imposed via a forward/backward implementation where the mapping w and the mask b of the previous frame are transformed to the coordinate system of the current frame using the image-domain optic flow between frames, and added as a prior to the current estimate, as follows:

$$E_{btemporal} = \sum_{\hat{u}} \|W_{prev}(\hat{u})) - W(\hat{u})\|^2 + \|b_{prev}(\hat{u})) - b(\hat{u})\|^2$$

Lighting has been ignored throughout the discussion above. It can addressed in two ways. First, when matching features change from frame to frame. (or from the mosaic to input frames), Scale Invariant Feature Transform (SIFT) descriptors may be used. As will be familiar to the skilled person, SIFT is an algorithm used to detect and describe local features in images. Second, when iteratively computing mappings (block 904), energy terms of the form $$\sum_{\hat{u}} \|I(w(\hat{u})) - C(\hat{u})\|_\tau$$

may be extended to include per-pixel intensity sealing terms $\alpha(x)$, $\beta(x)$ with a strong spatial smoothness prior, so the matching minimizes the expression $$\sum_{\hat{x}} \|\alpha(x)I(x, t) + \beta(x) - \tilde{I}(x, t)\|_\tau + \lambda_S \sum_{\hat{x}} \left\|\frac{\delta}{\delta x}\alpha(x)\right\| + \left\|\frac{\delta}{\delta x}\beta(x)\right\|$$

This gives invariance to smoothly changing lighting without allowing any color to match with any other. In turn, the above is implemented by defining $\alpha$ and $\beta$ in terms of a coarse set of fixed basis functions whose weights are included in a pyramid-based matching scheme.

Figure 10:
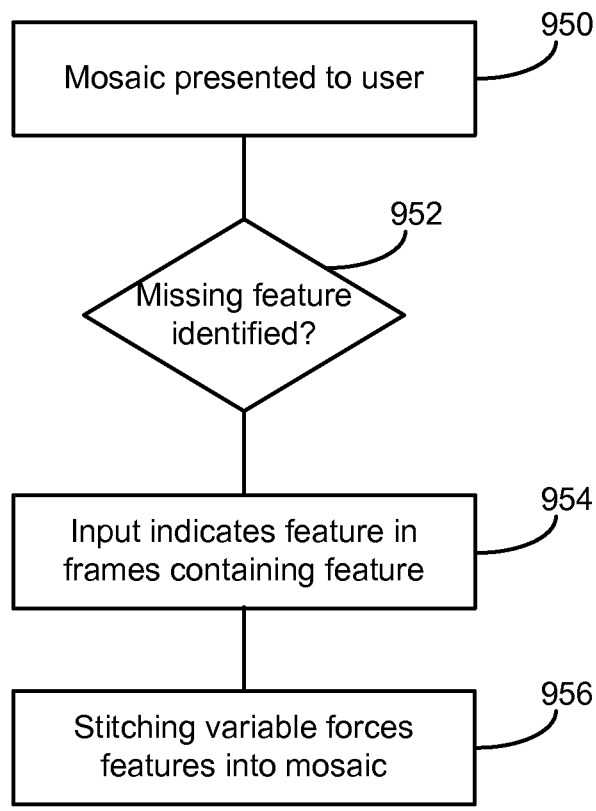
FIG. 10 is a flow diagram showing a method of allowing user interaction in the editing process.

Although the above algorithm can work completely automatically, there will generally be situations where lack of texture, repeated structures, or motion blurs, mean that the recovered mosaic does not cover all of the object. In one example, user interactions can be used to correct such errors. In the example now described with reference to the flow diagram of FIG. 10, two principles guide the design of such interactions: First, the interaction is indicative rather than precise and utilizes brush-based interactions (other examples could utilize interactions which specify precise coordinates, such as values for the mapping). Second, interactions propagate: interaction with only one frame has an effect on many other frames.

The interaction now described deals with improving the mosaic coverage. For example, not all frames of a video will represented in the final mosaic. The mosaic is presented to a user (block 950), who realizes that one or more frames which contain a unique portion of information are not included (block 952) (this may result because of the rule that adjacent pixels come from the same frame), for example by observing that a feature such as the mole is missing from the mosaic. If this is observed, a user can force a particular frame to be included in the mosaic by applying a brush stroke to the feature in that frame (block 954). This results in stitching variable $S(\hat{u})$ being given fixed values for some set of $\hat{u}$. These can be incorporated as hard constraints in the optimization of $$E_{data}^{robust}(\hat{s}) = \sum_{\hat{u}} \sum_{t} \min(\tau, \|I^w(\hat{u}, t) - I^w(\hat{u}, s(\hat{u}))\|) + $$
$$+ \lambda_{texture} \sum_{\hat{u}} \frac{Potts(s(\hat{u}), s(\hat{u} + (1, 0))) + }{Potts(s(\hat{u}), s(\hat{u} + (0, 1)))}$$

This yields better mosaic coverage which means that the mapping refinement stage can obtain good flow over more of the object's surface. The feature is forced into the mosaic.

Figure 6:
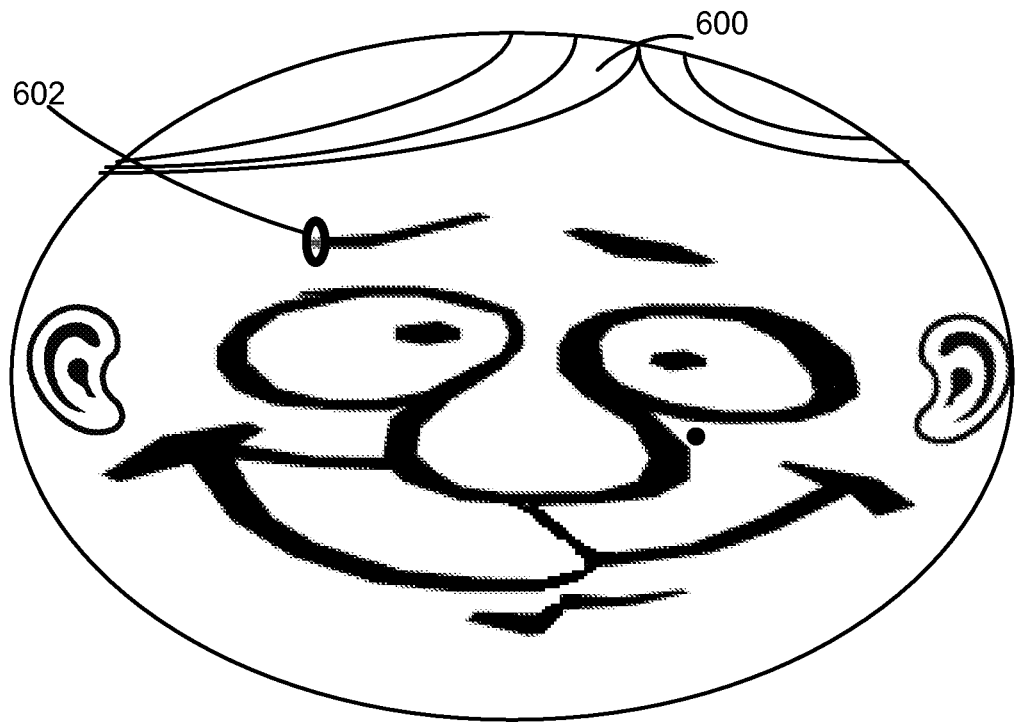
FIG. 6 shows an edited mosaic.
Figure 7:
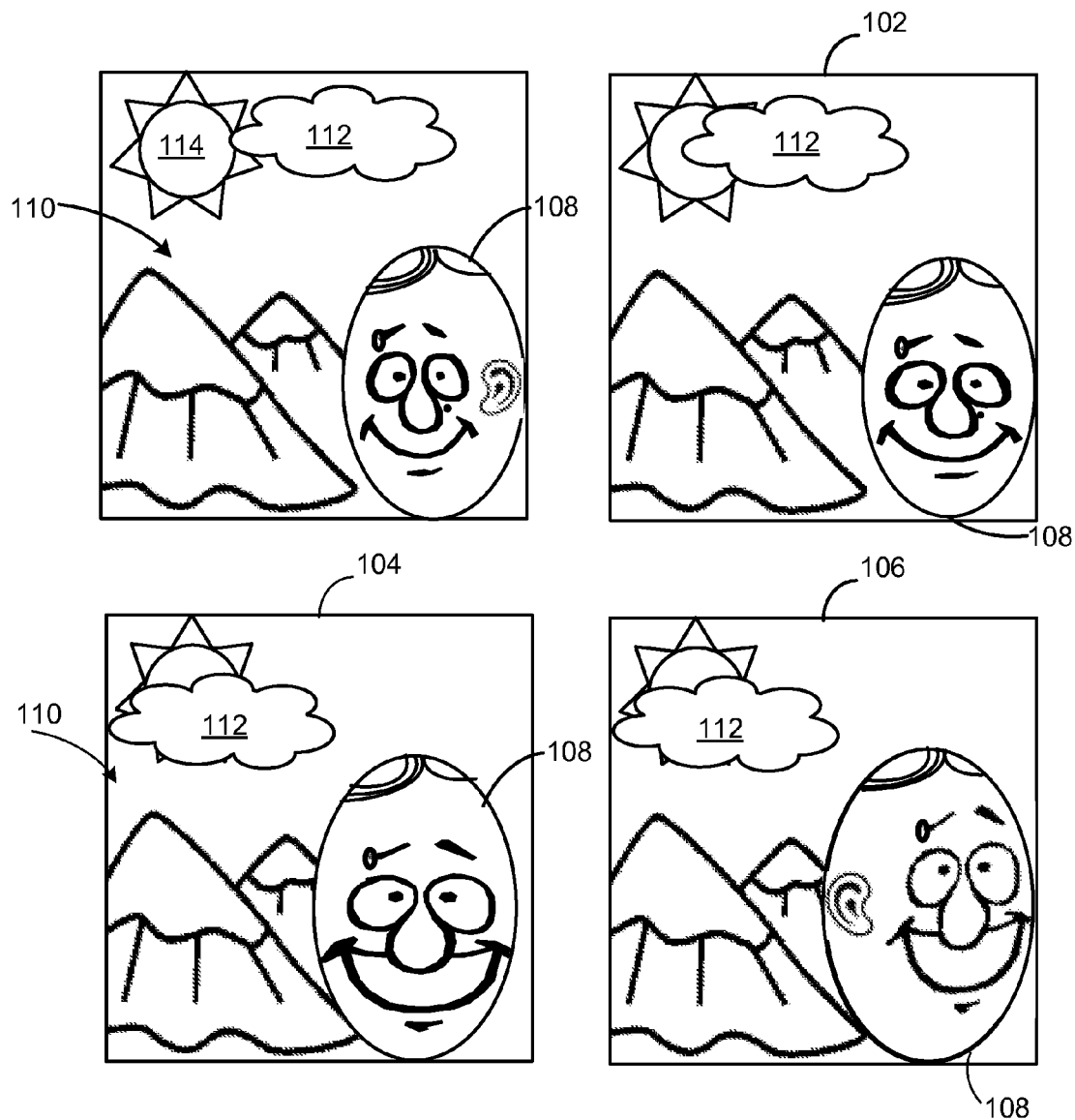
FIG. 7 shows four edited example frames from a portion of video footage.

Once the mosaic has been optimized (block 818), the various editing tasks can be carried out (block 820). In this example, as is shown in FIG. 6, hair 600 and an eyebrow ring 602 has been drawn onto the mosaic. This edited mosaic can be warped via the recovered mapping, and combined with the other layers of the original sequence (block 852). This has the effect of drawing on the object's surface as it moves, as is shown in the edited frames of FIG. 7, where the hair 600 and eyebrow ring 602 moves with the man's head. In practice, the re-rendered mosaic will not exactly match the original sequence, so the edit in this example is represented as an overlay on the texture map, which is warped by the 2D-2D mapping, masked by the occlusion masks, and alpha-blended with the original image. As will be familiar to the skilled person, 'alpha blending' is a combination of two colors allowing for transparency effects in an image. Another possible edit is to remove layers or portions of layers: a removed area can be filled in because the mapping is defined even in occluded areas. This will allow the cloud 114 to be removed: the background 110 and the sun 112 can be filled in from other frames. In other examples, image objects could be changed in size or shape or aspect ratio and again any background revealed by these changes could be filled in from other frames.

FIG. 11 illustrates various components of an exemplary computing-based device 1000 which may be implemented as any form of a computing and/or electronic device, and in which embodiments of the invention may be implemented.

The computing-based device 1000 comprises one or more inputs 1004 which are of any suitable type for receiving inputs such as an input from a digital video camera. The device 1000 also comprises a communication interface 1008 for communicating with other entities such as servers, other computing devices, and the like.

Computing-based device 1000 also comprises one or more processors 1001 which may be microprocessors, controllers or any other suitable type of processors for processing computing executable instructions to control the operation of the device in order to carry out the functions required to process a video sequence. Platform software comprising an operating system 1002 or any other suitable platform software may be provided at the computing-based device to enable application software 1005 to be executed on the device 100.

The computer executable instructions may be provided using any computer-readable media, such as memory 1003. The memory is of any suitable type such as random information memory (RAM), a disk storage device of any type such as a magnetic or optical storage device, a hard disk drive, or a CD, DVD or other disc drive. Flash memory, EPROM or EEPROM may also be used.

An output 1007 may also be provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method for processing video showing at least one deforming object comprising:
   (i) capturing a sequence of video frames showing the at least one deforming object;
   (ii) identifying a plurality of features of the at least one deforming object within the frames, each feature having a corresponding pixel;
   (iii) tracking the movement of the plurality of identified features between frames, the movement of each feature of the plurality of identified features being represented by a respective track of a corresponding plurality of tracks;
   (iv) analyzing the plurality of tracks representing the movement of the plurality of identified features to determine, for each pair of the tracks, a difference in position along the respective tracks;

(v) associating, with each track, a 2D coordinate such that a difference between a pair of the 2D coordinates associated with a corresponding pair of the tracks is similar to a maximally separated distance in video frames of the sequence of video frames for the corresponding pair of the tracks;

(vi) building a map using the tracks and the associated 2D coordinates of each track;

(vii) accounting for camera roll and zoom using a spatial regularizer comprising: a minimizing function comprising a determinant of a discrete mapping Jacobian and an overall 2D affine transform for each frame; and a temporal coherence term comprising a mapping term for each frame; and (viii) determining an energy for a mosaic created using the map and, if the mosaic does not match predetermined standards, performing energy minimization iteratively until said standards are reached, the predetermined standards being that a change in the energy from a previously calculated energy is less than a threshold value.

2. A method according to claim 1, which comprises using the map to create a mosaic of the at least one deforming object which provides a common reference frame for the at least one deforming object in the video frame sequence by replacing each feature of the plurality of features with the pixel corresponding to the feature in the sequence of video frames at the associated 2D coordinate along the respective track of the feature.

3. A method according to claim 2, which comprises presenting the mosaic to a user, accepting user edits of the mosaic and combining the user edits with the video frame sequence using the map.

4. A method according to claim 1 in which the energy minimization techniques comprise at least one of: minimizing the data cost of the tracks; minimizing the energy of the mapping function.

5. A method according to claim 1 in which each iteration is tested to determine if the energy has reduced and retried with alternative parameters if the energy has not reduced.

6. A method according to claim 1, which further comprises segmenting objects within the video frames following their capture and carrying out subsequent steps of the methods on the segmented objects independently.

7. A method according to claim 1 in which the analyzing the tracks to determine, for each pair of tracks, a difference comprises one of: (i) determining the frame in which the pair of tracks is maximally separated, and determining the distance between the tracks in that frame and (ii) using a softmax function.

8. A method according to claim 1, which comprises defining an occlusion mask function to account for the occlusion of features within the video sequence and minimizing the energy of the occlusion mask function as part of the energy minimization process.

9. A method according to claim 1, which is arranged to accept user input to ensure a particular feature of the plurality of features is represented in the map.

10. A method of processing video comprising:
receiving video footage comprising a plurality of video frames;
performing segmentation of the frames to determine a plurality of image objects;
determining a plurality of readily trackable features within the image objects;
tracking the readily trackable features from frame to frame;
using the spacing of the tracks to determine in which frame each of the readily trackable features is fronto-parallel;
creating a mosaic comprising a sampling of the frames using an algorithm which encourages, for each readily trackable feature, a selection of a frame in which the readily trackable feature is substantially fronto-parallel;
accepting user edits of the mosaic;
determining an energy for the mosaic and, if the energy does not satisfy predetermined standards, performing energy minimization iteratively until said predetermined standards are reached, the predetermined standards being that a change in the energy from a previously calculated energy is less than a threshold value;
accounting for camera roll and zoom using a spatial regularizer comprising: a minimizing function comprising a determinant of a discrete mapping Jacobian and an overall 2D affine transform for each frame; and a temporal coherence term comprising a mapping term for each frame; and
creating a mosaic of a deforming foreground object comprising a sampling of the frames such that each readily trackable feature of the foreground object is substantially fronto-parallel, resulting in the mosaic representing an unwrapped image of the deforming foreground object.

11. A method according to claim 10, in which the creating the mosaic includes creating the mosaic using an algorithm which encourages selection of adjacent pixels from the same frame.

12. A method according to claim 10, comprising using the tracking data to combine the user edits with the video footage.

13. A method according to claim 10 which comprises refining tracks using energy minimization.

14. A method according to claim 10, which comprises correcting for changes in lighting by allowing smooth changes in intensity in a pixel from frame to frame.

15. One or more device-readable memory having device executable instructions embodied thereon, the instructions, upon execution, configuring the device to perform operations comprising:
analyzing video comprising sequences of video frames to determine a plurality of features on at least one deforming object;
determining tracks characterizing the displacement of the features between frames;
determining a map of features using frames in which the features are substantially forward-facing;
determining a mosaic using the map, the mosaic comprising a sampling of the frames which are stitched together according to a stitching variable which encourages the selection of adjacent pixels from one frame;
determining an energy for the mosaic and, if the energy does not satisfy predetermined standards, performing energy minimization iteratively until said predetermined standards are reached, the predetermined standards being that a change in the energy from a previously calculated energy is less than one percent of the previously calculated energy;
presenting the mosaic to a user;
allowing user edits of the mosaic;
combining the user edits with the video footage;
accounting for camera roll and zoom using a spatial regularizer comprising: a minimizing function comprising a determinant of a discrete mapping Jacobian and an overall 2D affine transform for each frame; and a temporal coherence term comprising a mapping term for each frame; and
creating a mosaic of a deforming foreground object comprising a sampling of the frames such that each readily trackable feature of the foreground object is substantially fronto-parallel, resulting in the mosaic representing an unwrapped image of the deforming foreground object.

16. One or more device-readable memory having device executable instructions embodied thereon, the instructions, upon execution, configuring the device to perform operations according to claim 15, the operations further comprising refining the tracks using energy minimization techniques.

17. One or more device-readable memory having device executable instructions embodied thereon, the instructions, upon execution, configuring the device to perform operations according to claim 15, the determining the map of the features treating a surface of the at least one deforming object as undergoing smooth deformations over time.

18. A method according to claim 1 in which the associating, with each track, a 2D coordinate comprises computing an embedding of points of each of the tracks into two dimensions.

\* \* \* \* \*